April 2, 1957  M. MATH  2,787,508

COLLAPSIBLE WRITING AND READING LEAF

Filed Aug. 31, 1955  2 Sheets-Sheet 1

INVENTOR.
MOE MATH
BY
ATTORNEY

April 2, 1957  M. MATH  2,787,508
COLLAPSIBLE WRITING AND READING LEAF
Filed Aug. 31, 1955  2 Sheets-Sheet 2
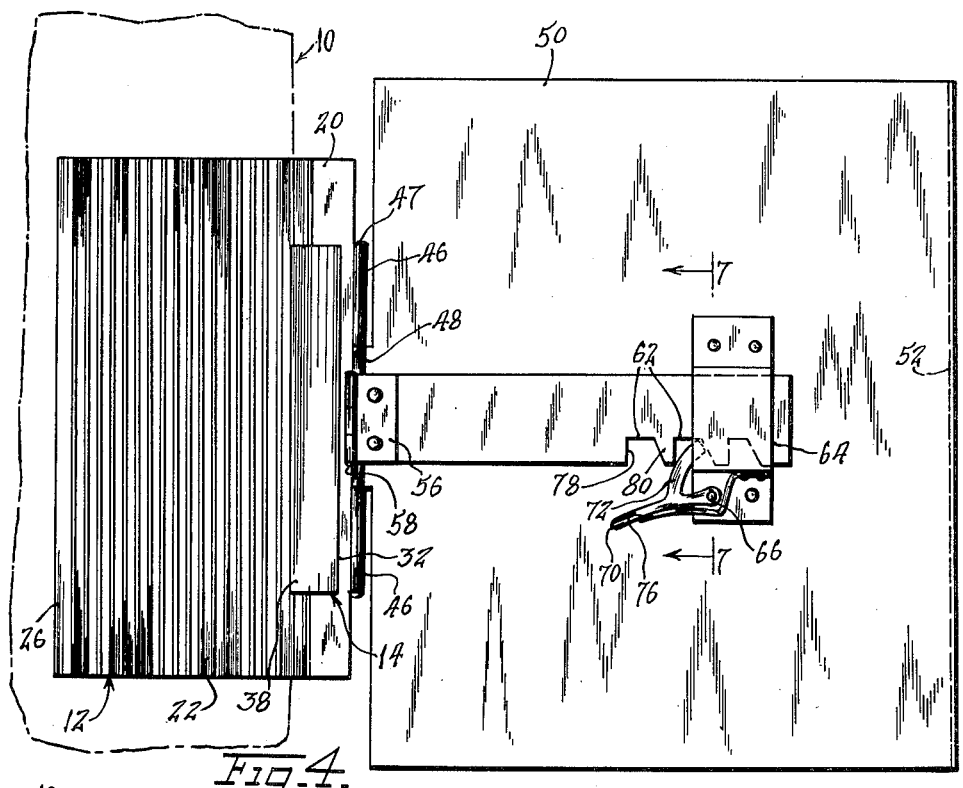
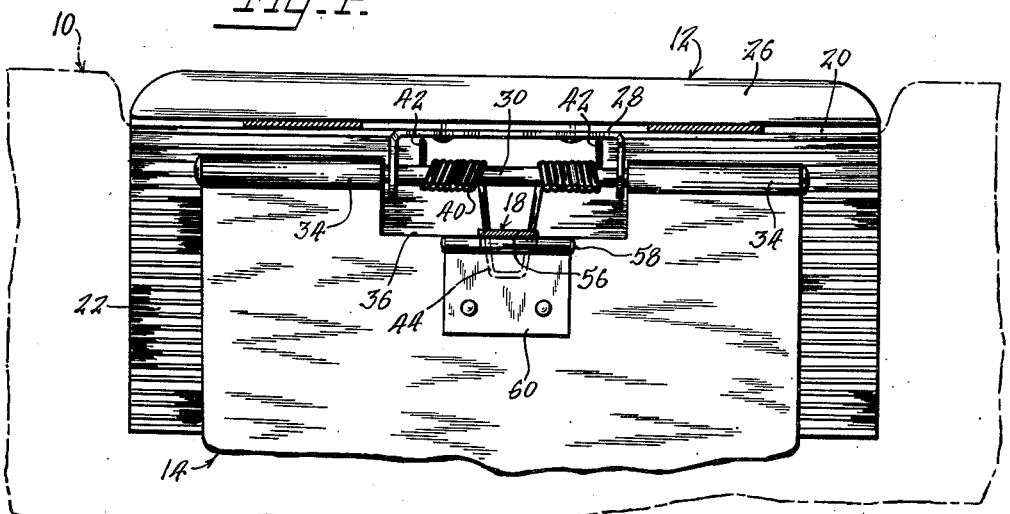
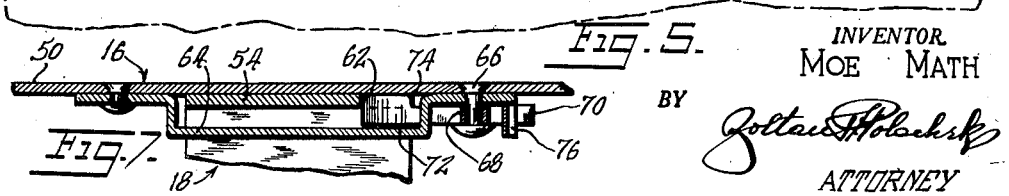
INVENTOR.
MOE MATH
BY
ATTORNEY United States Patent Office 2,787,508
Patented Apr. 2, 1957

2,787,508
COLLAPSIBLE WRITING AND READING LEAF
Moe Math, New York, N. Y.
Application August 31, 1955, Serial No. 531,710
3 Claims. (Cl. 311—21)

This invention relates to seat attachments, and more particularly has reference to an attachment in the form of a collapsible table or desk, capable of being clamped to the back of a vehicle seat, such as a railroad car seat, airplane seat, etc.

When a passenger in a railroad coach, airplane, or automobile desires to write or read, usually a makeshift support must be provided for the writing or reading material, and this is highly inconvenient to the passenger, due to the difficulty of holding the support steady, and due, further, to the difficulty of maintaining the support at a proper elevation to permit the writing or reading to be done with sufficient comfort.

An important object of the present invention, accordingly, is to provide a collapsible device of the nature referred to above, adapted to be removably clamped to the back of a seat, in a position in which the leaf on which the writing or reading material is supported will project rearwardly from said seat, in proper position for use by one seated in back of the seat to which the device is attached.

Another object is to provide a collapsible desk or table as stated wherein the clamp will be so designed as to engage firmly against the upholstered back of a seat, in such a manner as not to represent any projection from the back, thus to affect to a minimum the comfort of the passenger seated in the seat to which the device is attached.

A further object is to provide the clamp with means no only to facilitate grasping of the seat back upon which it is supported, but also an upholstered face adapted to blend smoothly into the upholstery of said seat back.

Another object is to shape the cooperating clamp sections in such a manner as to assure a firm grip upon the seat back.

Another object is to form the device in such a manner as to permit it to be collapsed into a relatively small area, thus facilitating its storage when not in use.

A further object is to facilitate adjustment of the rearwardly projecting leaf of the device to selected inclinations, so as to permit the same to be used with maximum comfort.

Another object is to provide a catch or dog on the leaf, engageable with a support brace for the leaf in such a manner as to provide a ratcheting action when the leaf is swung upwardly during adjustment of the same, with the downward pressure normally exerted upon the leaf while the same is in use being adapted to effectively interlock the catch and supporting brace in the selected position of adjustment of the leaf.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 4 is a bottom plan view of the device, as seen from the line 4—4 of Fig. 2.

Fig. 6 is a perspective view showing the dog and an associated spring member, per se.

Fig. 7 is an enlarged sectional view on line 7—7 of Fig. 4.

Figure 1:
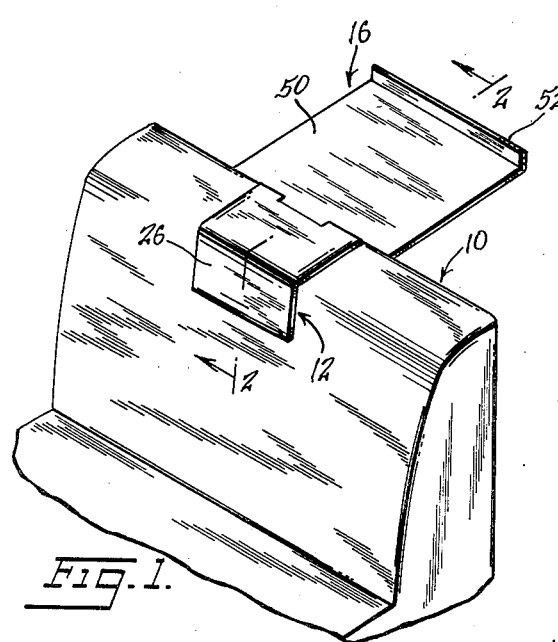
Fig. 1 is a perspective view showing the collapsible desk attachment as it appears when in use upon a vehicle seat.

Removably clamped to and straddling the upholstered back of a railroad, airplane, or other vehicle seat generally designated 10 is the collapsible desk constituting the invention. The desk includes four relatively swingable main cimponents, a front clamp section 12, a back clamp section 14, a support leaf 16 for writing materials or books, and a support brace 18.

Clamp sections 12, 14, when assembled and in use upon a seat back (see Fig. 2) coact to form a clamp approximately in the shape of an inverted U, with section 14 constituting the back leg of the clamp and being pivotally connected to the bight of the clamp at one end of the bight. Considering the particular construction of the clamp sections, front section 12 is of approximately right angular or L-shape and, considering the same as it appears when in use, includes a horizontal leg overlying the top of the seat back, and a depending leg overlying the front of the seat back. The clamp section 12 is formed with a backing plate 20, formed from a length of rigid sheet metal material, and bonded to the underside of the backing plate is a length of corrugated rubber material 22 adapted to engage against the upholstered material of the seat back. Bonded to the outer face of the backing plate 20 is a thickness of sponge or foam rubber 24, beveled at its edges, and covered by a suitable upholstering fabric 26.

Secured fixedly to the underside of the backing plate 20, at the rear edge thereof (Fig. 5) is a hinge pin support yoke 28 of inverted U-shape, having aligned openings in which is positioned the intermediate portion of a horizontally disposed hinge pin 30.

Figures 2, 8:
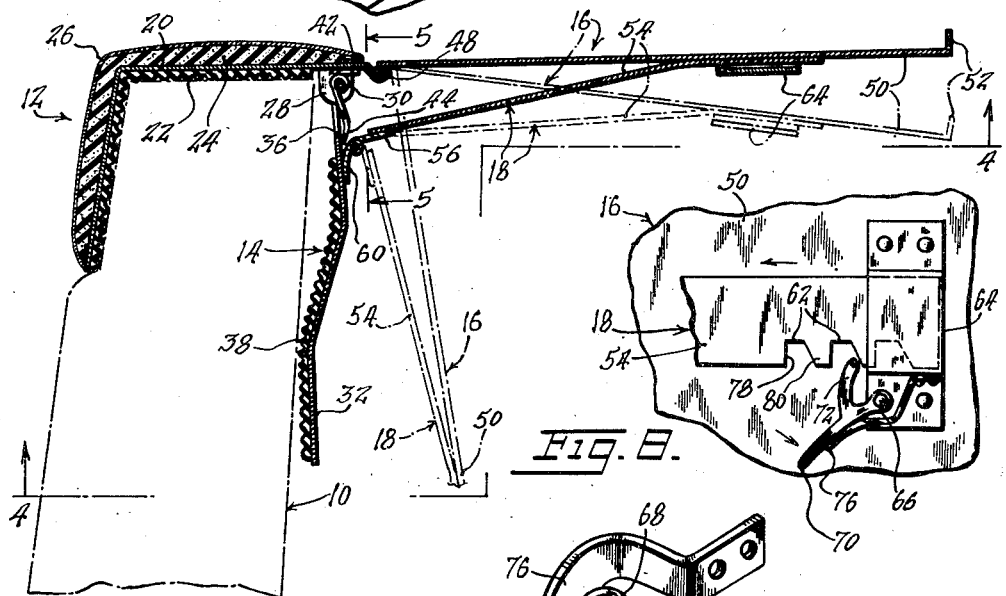
Fig. 2 is an enlarged sectional view on line 2—2 of Fig. 1, the chain-dotted lines showing one adjusted position of the leaf and the dash-dotted lines showing the leaf fully lowered.
Fig. 8 is a fragmentary bottom plan view showing the dog being biased to retracted position during relative swinging movement of the leaf and support brace.

The rear clamp section 14 comprises a rigidly constituted metal plate 32 compoundly curved in a longitudinal direction as shown in Fig. 2, and having a width slightly less than that of the clamp section 12, and a length substantially greater than that of the depending leg of the clamp section 12. At its upper end, plate 32 is provided at opposite sides thereof with aligned hinge sleeves 34 disposed at opposite sides of a wide recess 36 receiving the depending legs of the support yoke 28, and the end portions of the pin 30 extend through the sleeves 34, to connect the plate 32 to the section 12 for swinging movement about an axis paralleling the plane of the bight portion of the clamp defined by the sections 12, 14.

Bonded to the surface of plate 32 for engagement against the back of seat 10 is a corrugated, rubber facing member 38, extending from the lower end of plate 32 to a location adjacent the bottom of recess 36, and disposed over the full width of said plate 32.

Figure 3:
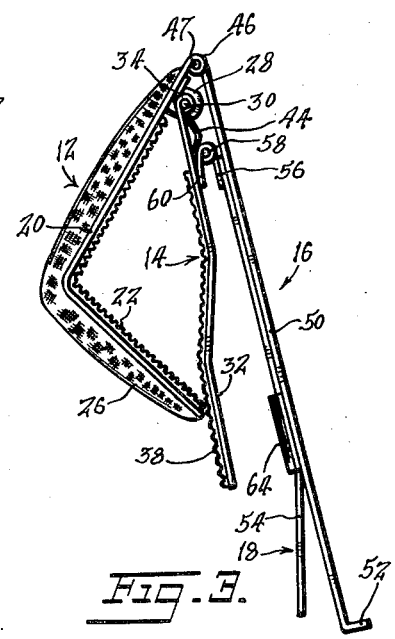
Fig. 3 is a side elevational view of the device fully collapsed.
Figure 5:
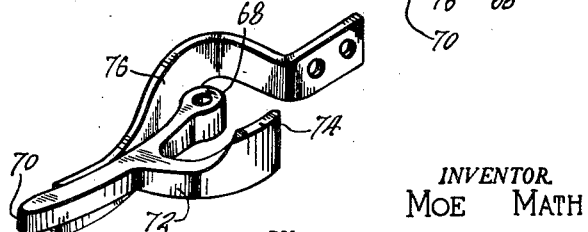
Fig. 5 is an enlarged sectional view on line 5—5 of Fig. 2.

A spring 40 has laterally bent end portions 42 in engagement with the underside of the bight of yoke 28, and adjacent the laterally extending extremities 42, has coiled portions of opposite pitch, merging at their inner ends into a U-shaped midlength portion 44 bearing against the back surface of plate 32. The spring is maintained under tension such as to normally swing the first and second clamp sections 12, 14 about their pivot 30 toward one another, when the device is disengaged from the seat back, as shown in Fig. 3. When the clamp sections are placed in embracing relation to the seat back, said spring is placed under substantial tension so as to cause the clamp to securely grip the seat back. The upholstered seat back, as shown in Figs. 1 and 5, is pressed inwardly by first clamp section 12 at the top and front of the seat back, so as to cause the upholstered surface of the clamp section 12 to be substantially flush with the adjacent surfaces of the seat back, thus to provide a maximum amount of comfort for one seated upon the seat to which the device is secured, and to provide, further, for relative inconspicuousness of the attached device. The upholstery of the device can match that of the seat back, if desired, to further add to the attractiveness of the overall appearance of the seat when the device is attached thereto.

Integrally formed upon the back edge of plate 20 are hinge sleeves 46 aligned coaxially with one another in parallelism with the pivot axis 30, and disposed above and rearwardly of said pivot axis 30 as shown in Fig. 2. Between sleeves 46, there is disposed, in coaxial alignment with said sleeves 46, a hinge sleeve 48 formed upon the front edge of a large, rectangular support leaf 50 having at its rear edge a transverse, upwardly projecting lip 52, which supports the bottom edge of a book when the leaf is being used as a book support and is, perhaps, inclined at an angle of approximately 45° to assure maximum comfort in reading.

The support brace 18 of the leaf 50 includes a flat, elongated bar member 54, fixedly secured at its front end to a leg 56 having a sleeve receiving a hinge pin 58 paralleling the hinge pin 30 and disposed below the hinge pin 30, the hinge pin 58 being carried by sleeves provided upon a hinge leaf 60 riveted to the upper end portion of plate 32 below recess 36. The upper portion of the leaf 60 is bent rearwardly as shown to best advantage in Fig. 2, to provide a recess receiving the bight portion of the U-shaped midlength part of spring 40.

In one side edge of the support brace 54 there are formed large notches 62, said notches being disposed adjacent the free end portion of the brace and said free end portion of the brace being loosely slidable within a downwardly offset guide 64, secured by rivets or equivalent fastening elements at its opposite ends to the underside of plate 50. One of the rivets is elongated to provide a pivot pin 66 (Fig. 7) extending through a sleeve 68 formed upon one end of an elongated catch arm 70 from which laterally projects a rearwardly curved dog 72 having at its free end an upwardly projecting enlargement 74 engageable in a selected one of the notches 62. A leaf spring 76 is secured at one end to one side of the guide 64, and at its other end bears against the outer surface of the arm 70, normally urging the catch in the direction of the bar 54.

As shown in Figs. 4 and 8, each notch has a forward wall 78 perpendicular to the length of the bar 54, and opposing the forward wall 78 is a rear wall 80 which is oblique to the longitudinal center line of said bar 54. The bar 54 is slightly curved in a longitudinal direction adjacent its free end as shown in Fig. 2, so as to facilitate the adjustment of the support leaf 50 between a fully lowered position shown in dash-dotted lines in Fig. 2, and an upper position shown in full lines in Fig. 2, in which the support leaf is disposed substantially in a horizontal plane.

The arm 70 constitutes a handle, and one can swing the catch counterclockwise about its pivot 66, viewing the same as in Fig. 4, whenever it is desired to disengage the catch from the selected notch in which it was previously engaged, for the purpose of permitting the leaf 50 to be swung downwardly to its full lowered position. Then, the catch can be released, and at such time as the leaf is swung upwardly, it will spring into the innermost notch 62. If it is desired to swing the leaf upwardly to a greater extent, as for example, to dispose the same in the full line position of Fig. 2, the catch is held outwardly from the notches, and is then permitted to swing inwardly to the selected notch 62 to maintain the leaf in its selected position of adjustment.

The leaf tends to gravitate to a lowered position, and as a result, the perpendicular wall 78 of the selected notch exerts a cam pressure upon the convexly curved edge of the dog 72, biasing the same inwardly of the selected notch to the position shown in Fig. 4. The more downward pressure that is exerted against leaf 50, as for example, by the weight of a supported book or by pressure exerted by the user during writing, the firmer will be the engagement of the dog in the selected notch.

Whenever it is desired to raise the leaf 50 to a higher position, the user simply lifts upwardly upon the leaf, and under these circumstances, the bar 54 will, in effect, move in the direction of the arrow shown in Fig. 8. This causes the oblique edge 80 of the notch 62 to exert a cam pressure against the extremity of the dog 72, tending to bias the catch in a clockwise direction about its pivot 66, out of the notch. The dog thus ratchets along the series of notches until the leaf has been raised to the selected extent, after which the dog will be biased into the selected notch by the spring 76 and will lock therein in the manner previously described.

While only three notches have been illustrated by way of example, it will be understood that the notches can be of any desired number and at any desired locations along the length of bar 54, to facilitate the adjustment of the leaf to a maximum number of positions.

When the device is fully collapsed, the leaf swings downwardly against the rear clamp section 14 as shown in Fig. 3, permitting collapse of the device into a minimum overall area for facilitating storage thereof when it is not in use.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A desk attachment for a seat back comprising a clamp shaped to engage said back, a leaf hinged to the clamp to swing about an axis extending transversely of the clamp and leaf between raised and lowered positions, a support brace hinged to the clamp to swing about an axis paralleling the first axis, and a catch carried by the leaf engaging the brace in the raised position of the leaf to hold the leaf in said raised position, said clamp comprising a front clamp section shaped to overlie the front and top of said seat back and a back clamp section hinged to the front clamp section and shaped to overlie the rear surface of said seat back, said clamp including spring means associated with the respective sections tending to normally bias the same into engagement with the respective surfaces of said seat back, said spring means being coiled about the hinge axis of the connected clamp sections, and including a midlength portion bearing against the second clamp section and having its extremities bearing against the first clamp section, the second clamp section having a hinge leaf secured thereto, said brace being pivotally connected to the hinge leaf of the second clamp section to provide the hinge connection between the brace and clamp, said hinge leaf of the second clamp section having a portion spaced outwardly from the adjacent surface of the second clamp section to provide a recess for the midlength portion of said spring means.

2. A desk attachment for a seat back comprising a clamp shaped to engage said back, a leaf hinged to the clamp to swing about an axis extending transversely of the clamp and leaf between raised and lowered positions, a support brace hinged to the clamp to swing about an axis paralleling the first axis, and a catch carried by the leaf engaging the brace in the raised position of the leaf to hold the leaf in said raised position, the leaf including a guide in which the support brace is loosely slidable, said catch being mounted upon the guide at one side of the support brace, the support brace at said side thereof having a longitudinal series of notches and said catch being shaped to engage in a selected one of said notches when the leaf is raised, to support the leaf in a selected position of swingable adjustment, each of said notches having a forward wall perpendicular to the length of the support brace and a rear wall oblique to said length of the support brace, said catch including a curved dog engageable by the first wall on the exertion of downward pressure against the leaf to lockably engage the dog in the selected notch, the rear walls of the notches being shaped to cam the dog outwardly from the notches when the leaf is lifted for ratcheting of the dog over the series of notches.

3. A desk attachment for a seat back comprising a clamp shaped to engage said back, a leaf hinged to the clamp to swing about an axis extending transversely of the clamp and leaf between raised and lowered positions, a support brace hinged to the clamp to swing about an axis paralleling the first axis, and a catch carried by the leaf engaging the brace in the raised position of the leaf to hold the leaf in said raised position, the leaf including a guide in which the support brace is loosely slidable, said catch being mounted upon the guide at one side of the support brace, the support brace at said side thereof having a longitudinal series of notches and said catch being shaped to engage in a selected one of said notches when the leaf is raised, to support the leaf in a selected position of swingable adjustment, each of said notches having a forward wall perpendicular to the length of the support brace and a rear wall oblique to said length of the support brace, said catch including a curved dog engageable by the first wall on the exertion of downward pressure against the leaf to lockably engage the dog in the selected notch, the rear walls of the notches being shaped to cam the dog outwardly from the notches when the leaf is lifted for ratcheting of the dog over the series of notches, said catch further including a spring secured at one end to the guide and tensioned at its other end to bear against the catch in a direction to normally bias the catch into the selected notch.

References Cited in the file of this patent

UNITED STATES PATENTS

| | | |
|---|---|---|
| 133,487 | Rehfuss | Nov. 26, 1872 |
| 1,405,362 | Van Etten | Jan. 31, 1922 |
| 1,436,601 | Miemeyer | Nov. 21, 1922 |
| 1,788,800 | McGinley | Jan. 13, 1931 |
| 2,001,507 | Stribling | May 14, 1935 |
| 2,494,798 | Dobkin | Jan. 17, 1950 |
| 2,693,400 | Erickson | Nov. 28, 1952 |